May 8, 1951 E. D. TILLYER 2,552,125
WELDING GLASSES AND PROCESS OF FORMING
Filed Feb. 4, 1947
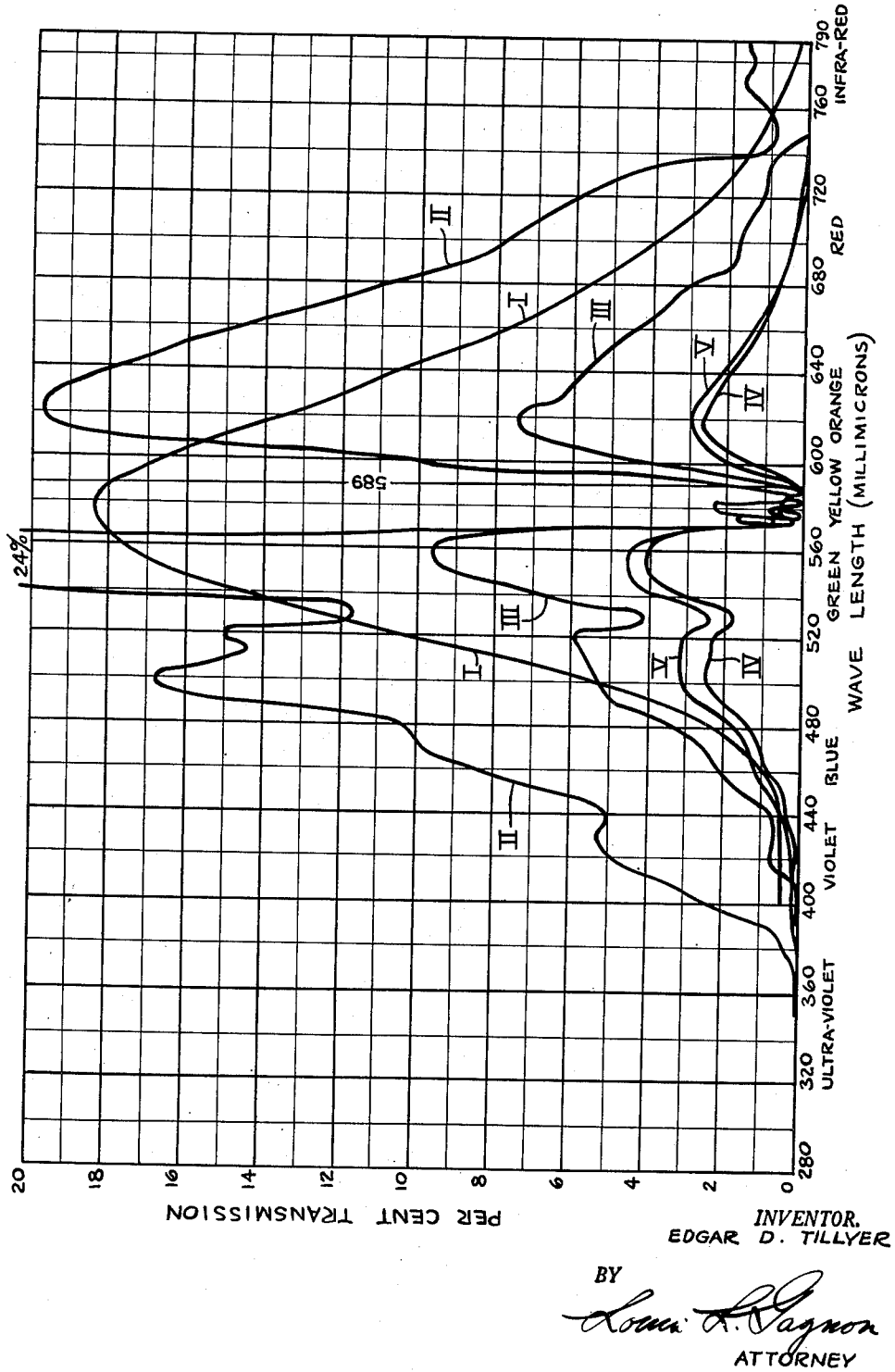
INVENTOR.
EDGAR D. TILLYER
BY
ATTORNEY Patented May 8, 1951

2,552,125

UNITED STATES PATENT OFFICE 2,552,125

WELDING GLASSES AND PROCESS OF FORMING

Edgar D. Tillyer, Southbridge, Mass., assignor to American Optical Company, Southbridge, Mass., a voluntary association of Massachusetts Application February 4, 1947, Serial No. 726,346

7 Claims. (Cl. 106—52)

This invention relates to improvements in welding glasses and relates particularly to a new welding glass composition, lenses, and plates of said glass composition.

This application is a continuation-in-part of my abandoned application Serial No. 486,748, filed May 12, 1943.

One of the principal objects of the invention is to provide a glass composition, lenses and plates of said composition, having embodied therein properties for selective absorption of the invisible portions of the spectrum and for reducing the visible portion of the spectrum to required amounts and, in addition thereto, to eliminate the sodium flare present during torch welding, arc welding, etc.

Another object is to provide lenses or plates embodying a glass composition of the above character whereby ordinary visibility of the work during arc or torch welding or the like is greatly increased and which will simultaneously afford protection for the eyes of the individual from said torch welding, glass blowing and other similar operations.

Other objects and advantages of the invention will become apparent from the following description and it will be apparent that many modifications may be made in the specific glass composition given without departing from the spirit of the invention as expressed in the accompanying claims. The invention therefore is not to be limited to the exact compositions given as the preferred forms are given herein only by way of illustration.

In the drawing are shown plotted curves of the visible ray transmission characteristics of four examples of glass compositions according to the invention and one example of a prior art glass composition.

In torch welding or blowing glass with a torch there is a yellow flare around the object produced by volatilized sodium vapor. This sodium flare comes from the glass, when glass blowing, the soda dust in the atmosphere, or the flux on metal rods when welding. It is almost impossible to see the exact point of contact of the hottest part of the flame with the metal or the glass because of this flare surrounding it. Welders call this the flame which they can not see through. It is possible sometimes to see through this flame by looking down along the path of the torch but only a tiny bit of the work is seen. This flame is composed of ordinary sodium lines of an average wave length of approximately 589 millimicrons. The absorption of the light at approximately this wave length would remove this glare and permit the work to be seen with much greater distinctness and therefore facilitate performing welding operations, or blowing glass, etc.

In addition to absorption of these visible lines the ultra-violet and infra-red range of the spectrum must be absorbed to give protection to the eyes and the total light visible must be cut down so that it is not too brilliant to the operator, that is, to remove the glare from the light.

Certain welding glasses of the prior art have ingredients in them which remove the ultra-violet, greatly reduce the infra-red and reduce the visible part of the spectrum to desired amounts. In these glasses, however, there is no appreciable increased absorption for the sodium lines or the flare around the work. This, therefore, greatly interferes with the visibility of the work. With the compositions set forth herein, the yellow flare is greatly reduced and the visibility at the point of work very greatly increased. The present invention, therefore, is directed more particularly to a homogeneous glass composition embodying all of the features set forth above.

The rare earth element neodymium and its oxide, neodymium oxide, have this desired characteristic when incorporated in a glass composition of absorbing the yellow sodium flare. However, from a commercial aspect, to utilize the pure neodymium oxide to produce this result would be too expensive. The associated rare earth oxides are so similar in chemical properties and because they occur always co-mingled together in the raw ore as mined, it is an extremely difficult laborious and expensive undertaking to separate them into the individual rare earths. Only by repeated fractional crystallizations can they be separated.

Although there are several minerals which contain the mixture of rare earth oxides, monazite sand is the present chief and only commercial source from which they are derived. In the monazite sand the rare earth oxides, including the neodymium oxide, occur in roughly the same relative proportions no matter from what part of the world the monazite sand is mined. Following is a table giving typical analyses of monazite sand as obtained from the world's chief commercial sources, as given in B. S. Hopkins' "Chapters in the Chemistry of the Less Familiar Elements," published by Stipes Publishing Co., Champagne, Illinois, 1939:

Table A

|  | Ceylon | Nigeria | India | Brazil | Carolina | General Average by H. S. Miner |
|---|---|---|---|---|---|---|
| $ThO_2$ | 9.45–28.20 | 3.20–8.00 | 10.22–8.65 | 6.06 | 4.32 | 5 |
| $CeO_2$ | 27.15–20.65 | 36.53–30.50 | 31.90 | 62.12 | 34.32 | 30 |
| $La_2O_3$ | 29.59–21.63 | 30.00–28.80 | 28.00 |  | 31.24 | 30 |
| $Di_2O_3$ etc. |  |  |  |  |  |  |
| Yttrium Group Oxides | 3.93–0.94 | 0.39–1.43 | 0.46–0.62 | 0.80 | 1.10 | 2 |
| $Fe_2O_3$ | 0.87–1.13 | 1.20–0.81 | 1.50–1.09 | 0.97 |  |  |
| $Al_2O_3$ | 0.17–0.29 | 0.10–0.20 | 0.17–0.12 | 0.10 |  | 5 |
| $CaO$ | 0.45–0.10 | 0.21–0.17 | 0.20–0.13 | 0.21 |  |  |
| $SiO_2$ | 1.67–6.09 | 0.63–1.79 | 0.90–1.00 | 1.40 | 0.86 |  |
| $P_2O_5$ | 26.12–20.20 | 28.29–28.16 | 26.82–50.26 | 28.50 | 29.30 | 28 |

In some instances small amounts of $ZnO_2$, $TiO_2$ and $Ta_2O_5$ are also contained in the monazite sand as impurities.

Monazite sand has been chiefly valuable for its thorium content. In the refining of the monazite sand to obtain the thorium, most of the phosphorus pentoxide is driven off, leaving as a residue or by-product, a mass consisting substantially of a mixture of the rare earth oxides in substantially unchanged form and relative proportions as they existed in the original monazite ore. This residue has the approximate following analysis:

Table B

| | Per cent by weight |
|---|---|
| Cerium oxide | 50 |
| Lanthanum oxide | 25 |
| Neodymium oxide | 17 |
| Praesodymium oxide | 5 |
| Samarium oxide, etc. | 3 |

It is commercially known and sold under the name Rare Earth Oxides.

In the past, it was considered to be of little commercial value. However, as set forth herein, it has been found that all of these rare earth oxides have glass forming characteristics and that if introduced into a given glass composition such oxides will combine with and partially replace the normally necessary amounts of the initial glass forming ingredients of the composition such as silica and calcium oxide. This may be accomplished without substantially interfering with the resultant glass melts. The alkali content and fining agents as in conventional practice are altered slightly to improve the workability of the glass melt. Due to the above facts, the neodymium oxide which is present in said Rare Earth Oxides can thereby be introduced into the glass composition, with the amount of Rare Earth Oxides added being controlled according to the amount of neodymium oxide desired in the glass. This is accomplished by following the usual conventional methods of the art. These Rare Earth Oxides do have some small coloring effect when added to the glass composition. However, inasmuch as applicant's glass compositions require substantial amounts of iron so as to cut down the visible ray transmission to a comfortable level and to absorb the infra-red rays, the resultant glass has a relatively dark shade and low transmission and therefore the slight changes in coloring effect introduced by the Rare Earth Oxides are largely overshadowed by the iron content. Thus, by adding this ingredient known as Rare Earth Oxides to a welding glass in controlled amounts, the desired sodium line absorption characteristic may be imparted to the welding glass in a relatively, inexpensive, efficient and practical manner. It is to be understood that the mixture of Rare Earth Oxides is added to the glass batch in the form of a hydrate, carbonate, etc. which on ignition or reaction will cause the Rare Earth Oxides to enter into the resultant glass composition as a homogeneous part thereof. The Rare Earth Oxides will retain substantially the same relative proportions unchanged from those in which they occurred in the raw ore, monazite sand.

Following is a table showing analyses of a glass having infra-red, ultra-violet and visible ray absorption characteristics and glasses of similar compositions to which the ingredient known as Rare Earth Oxides has been added to give the additional characteristic of sodium line absorption.

Table C

|  | I | II | III | IV | V |
|---|---|---|---|---|---|
| Silica ($SiO_2$) | 72.2 | 54.8 | 54.4 | 53.9 | 53.7 |
| Sodium Oxide ($Na_2O$) | 14.7 | 10.6 | 10.6 | 10.5 | 10.5 |
| Potassium Oxide ($K_2O$) |  | 5.0 | 5.0 | 5.0 | 4.9 |
| Calcium Oxide ($CaO$) | 7.7 | 2.0 | 2.0 | 2.0 | 2.0 |
| Iron Oxide ($Fe_2O_3$) | 4.3 | 2.2 | 3.0 | 3.7 | 4.2 |
| Rare Earth Oxides |  | 24.5 | 24.2 | 24.1 | 24.0 |
| Sulfur Trioxide ($SO_3$) | 0.5 | 0.4 | 0.4 | 0.4 | 0.3 |
| Chlorine ($Cl_2$) | 0.4 | 0.4 | 0.4 | 0.4 | 0.3 |
| Arsenic Pentoxide ($As_2O_5$) | 0.2 | 0.1 | 0.1 | 0.1 | 0.1 |
| Bureau of Standards Shade Designation | 3 | 3 | 4 | 5 | 6 |
| Ultra-Violet transmission shorter than 350 mu percent | <⅛ | <⅛ | <⅛ | <⅛ | <⅛ |
| Visible Ray Transmission percent | 14.8 | 13.8 | 5.25 | 1.95 | 0.725 |
| Total Energy Transmission [1] percent | 2.5 | 3.0 | 0.95 | 0.30 | 0.40 |
| Sodium Line Transmission percent | 18.0 | 1.8 | 0.50 | 0.23 | 0.10 |
| Efficiency of Sodium Line Absorption percent | minus 22 | 87 | 90 | 88 | 86 |
| Glass Thickness mm | 2.05 | 3.6 | 3.67 | 3.8 | 3.7 |

[1] This is the total energy from a regular 200 watt gas filled lamp running at normal voltage measured by a thermopile.

In column I is shown a glass composition for a welding glass of a shade designated by the United States Bureau of Standards as approximately 3. It has good absorption in the infra-red, ultra-violet and visible ray regions but low in absorption of the 589 mm. wave length, that is, in absorbing sodium flare. Referring to said table and to its transmission curve I as shown in the drawing, such a glass having a thickness of 2.05 mm. would have a total energy transmission of but 2.5% and would have a total transmission in the visible region of 14.8%. However, it would transmit 18% of the sodium flare. Using the formula $$\frac{V-S}{V}=E$$

wherein V represents the total percent of visible ray transmission and S the percent of sodium line transmission, the efficiency of sodium line absorption (E) for this particular composition is minus 22%. In other words, although it is an excellent glass for many purposes, it is less efficient in cutting out the yellow sodium flare than wearing no glass but it does protect the eyes from injurious radiation.

Referring to columns II, III, IV and V and to the respective transmission curves for the compositions set forth therein, it will be noted that by adding approximately 24 parts of the ingredient known as Rare Earth Oxides to the composition of column I, reducing the silica and calcium oxide proportionately and adjusting the alkalis and fining agents (SO3Cl2As2O5) to obtain a good working glass, an excellent cut off may be obtained in the sodium line while maintaining substantially the same absorptive qualities in the visible and invisible regions. In these glasses, the iron content is somewhat reduced to obtain comparable shades. For example, in applicant's glass, using the same amount of Fe2O3 used in composition I, a shade somewhat darker would be obtained. This is due to the slight coloring effect of the Rare Earth Oxides.

Column II denotes a glass composition containing 24.5 parts of Rare Earth Oxides and an amount of iron necessary to obtain a shade comparable to that of composition I. It will be noted that such a glass transmits only 1.8% of the sodium flare and has an efficiency relative to the total visible region for absorbing the sodium flare of about 87%. Column V denotes a glass composition having substantially the same iron content as the base glass composition I. Such a composition transmits somewhat less of the visible and invisible rays and cuts off all but 0.10% of the sodium line. It has an efficiency for absorbing the sodium flare of approximately 86%. Glass compositions III and IV denoting shades intermediate compositions II and V have sodium line absorption efficiencies of 90% and 88% respectively.

Referring to the transmission curves of the several glass compositions set forth in Table C, it will be noted that composition I not containing the Rare Earth Oxides has less than 1% transmission in the violet band, and rapidly rises to a peak transmission of approximately 18% in the yellow band and then rapidly recedes so as to be transmitting less than 2% of the visible rays as it passes into the infra-red region at about the 750 line. At the sodium line 589 it is practically at its peak transmission, thus explaining its low efficiency in absorbing sodium flare. Where the Rare Earth Oxides have been added to such a composition as shown in curves II through V, this rapid rise and recession is interrupted by abrupt cut offs in the green at approximately the 530 mm. wavelength and at the yellow band with almost zero transmission at the sodium line 589. Thus, such glasses while permitting maximum visual overall transmission cut off with maximum efficiency the sodium line flare. The examples set forth efficiencies of absorption at the sodium line of from 86 to 90%. Although it is preferred that this efficiency value be equal to 86% or better, it has been found that, for practical purposes, a glass that is more than 75% efficient in this respect is desirable. It should be apparent that by controlling the amount of Rare Earth Oxides added to the glass composition with suitable adjustment of the silica and calcium oxide content, glass compositions having varying efficiencies in absorbing at the sodium line can be obtained.

It is to be understood that in keeping with the invention, other crude or unrefined mixtures of the Rare Earth Oxides containing neodymium than the by-product of the first refinement of monazite ore to obtain the thoria content mentioned above may be used to obtain glasses having a relatively high efficiency in absorbing light rays at the sodium line. For example, lanthanum and cerium are becoming valuable for other purposes and are sometimes extracted from the Rare Earth Oxides. The by-product or residue after the extraction of either lanthanum or cerium would still be usable for applicant's purposes. In such instances, however, trial runs would have to be made using various amounts of the Rare Earth Oxides mixture in sample glass compositions and subjecting said sample pieces obtained to a spectroscopic examination to determine their visible ray and sodium line transmission percentages. Then by utilizing the formula $$\frac{V-S}{V}=E$$

the trial piece having the desired sodium line absorption efficiency would be selected as the basis for using that particular batch of Rare Earth Oxides.

Where the cerium has been largely removed from the Rare Earth Oxides, a mixture results having the following approximate analysis and is available commercially.

Table D

| | Per cent |
|---|---|
| Lanthanum oxide | 52 |
| Cerium oxide | 2 |
| Praesodymium oxide | 2 |
| Neodymium oxide | 32 |
| Samarium oxide | 7 |
| Thorium, yttrium oxides | 2 |
| Alaline earths | 3 |

An example of a glass composition using such a rare earth oxide mixture would be one having substantially the following analysis:

Table E

| | Per cent |
|---|---|
| Silica (SiO2) | 58.9 |
| Sodium oxide (Na2O) | 14.0 |
| Barium oxide (BaO) | 7.0 |
| Titanium oxide (TiO2) | 2.9 |
| Sodium chloride (NaCl) | .7 |
| Sodium sulphate (Na2SO4) | .7 |
| Arsenic pentoxide (As2O5) | .4 |
| Iron as Fe2O3 | 4.1 |
| Rare Earth Oxides of Table D | 11.0 |

Such a glass would have the following transmission values for a 2.8 shade as compared to those in columns I through V of Table C.

| | Per cent |
|---|---|
| Ultra-violet ray transmission | <1/5 |
| Visible ray transmission | 6.1 |
| Total energy transmission | 1.0 |
| Sodium line transmission | 1.1 |

At a thickness of 2.5 mm., such a glass would have an efficiency for absorbing the sodium lines of about 82% as measured. This corresponds to about 90% at 3.5 mm. as computed.

In order to facilitate the melting and fining of these compositions from 0 to 3 part of $SO_3$, $Cl_2$, $Na_2SO_4$, NaCl, $As_2O_5$, and $Sb_2O_5$ may be added, severally or individually. To obtain infra-red absorption and decrease of visible transmission, from 1.0 part to 10 parts of $Fe_2O_3$ are used, depending upon the shade desired. In order to get the proper reduction of the iron to the correct degree of ferric ferrous ratio the furnace gases may be controlled so that they are somewhat reducing and carbon, in the form of coal, graphite or some similar reducing agent may be added. Also in place of the carbon or with it as a reducing agent silicon carbide may be used. If sufficient reducing agents are added the furnace gases don't have to be reducing. The amount of these reducing agents required depend upon the type of furnace that the glass is melted in and the type of flame in that furnace, that is, where there is excess oxygen or excess carbon monoxide. Where there is an excess of oxygen much more reducing agent such as graphite must be used. Where there is an excess of monoxide practically no reducing agent may be used. The number of parts by weight are given as illustrative of a very satisfactory batch. These may be varied widely as it is merely an ordinary ferrous glass batch modified to contain the Rare Earth Oxides as explained below.

The glass composition given is one in which approximately 3 to 4 parts of $Fe_2O_3$ works best. If less $Fe_2O_3$ is used, more CaO is preferable, if more $Fe_2O_3$ is used CaO may be reduced or omitted. If less Rare Earth Oxides are used more $SiO_2$ is desired and vice versa. The ratio of $Na_2O$ and $K_2O$ to each other may be varied but entire substitution of one for the other is not desirable. The total amount of alkalies may have the usual range of variation as is common in ordinary glass batches. Too much alkali makes the glass melt better but is not as stable a glass. The addition of alumina is advantageous if enough is not dissolved from the pot in ordinary melting. A small amount of alumina makes the glass more stable and more resistant to the action of water if there is not enough pot solution or if not enough is present in the sand ($SiO_2$).

In order to get the desired amount of Rare Earth Oxides in this composition as pointed out, some of the other essential ingredients of the glass such as the silica and calcium oxide have had to be reduced beyond the proportions normally used in ordinary glasses. If the proportion of the Rare Earth Oxides is increased beyond the approximate 24 parts given in the examples, then the silica must accordingly be reduced below the approximate 54 parts by weight mentioned in these preferred compositions. With respect to the alkalies the soda and the potash, the total of these as given, is about 15 parts which makes a good working glass. Either may be increased at the expense of the other one without changing the effectiveness of the glass but does interfere a little with the working of the glass composition. In fact, the total of the two alkalies may be changed from either 10 to 18 parts but the glass will not be quite as nice a working glass in the furnace.

The use of soft coal instead of graphite as a reducing agent sometimes improves the glass a little as it contains a little sulphur which apparently becomes advantageous by possibly forming a small amount of an iron sulphide in the glass; too much produces too yellow a tint. The iron sulphide seems to improve the infra-red and ultra-violet absorption to some extent.

The use of rare earth oxides and the modification of the base composition, to enable the use of said ingredient, as set forth above, enables the production of a glass which in use has desirable absorption as to the invisible and visible portions of the spectrum as well as elimination of sodium flare and enables the accomplishing of said results in a simple, efficient, and extremely inexpensive manner as compared with known prior art methods.

The glass compositions given above are the preferred compositions but glass compositions having sodium line absorption efficiencies greater than 75% will result from fusing together the following:

Parts by weight
Silica ($SiO_2$) _____ approximately 50 to 72
Alkali ($Na_2O+K_2O$) ____ approximately 10 to 18
Calcium oxide (CaO) ____ approximately 1 to 10
Fining agents such as $SO_3$, $Cl_2$, $Na_2SO_4$, NaCl, $As_2O_5$, or $Sb_2O_5$ _____ approximately 0 to 3
Iron oxide as $Fe_2O_3$ _____ approximately 1 to 10
Rare Earth Oxides _____ approximately 10 to 30

It is to be understood that a conventional small amount of alumina may be added to the above batch before melting in addition to the small amount inherently present in the sand or solution of the ingredients of the pot.

Preferably, the silica and Rare Earth Oxides content should comprise approximately from 60 to 85 parts by weight in toto.

It is to be understood also that pure neodymium may be used in forming the glass to obtain the desired results but in instances when pure neodymium is used, the amount of Rare Earth Oxides is accordingly reduced and the silica is increased approximately according to the reduction of the Rare Earth Oxides.

From the foregoing description it will be seen that simple, efficient, and economical means have been provided for accomplishing all of the objects and advantages of the invention.

Having described my invention, I claim:

1. A protective glass of the character described consisting essentially of a silica-soda-potash-lime base containing from 1 to 10 per cent by weight of iron oxide and a mixture of rare-earth oxides as derived from monazite sand and including neodymium in proportion sufficient that it constitute from approximately 2 to 5 per cent of the glass, the silica content comprising at least half the glass by weight and said mixture of rare earth oxides and silica together constituting from approximately 60 to 85 per cent by weight of the glass, and the soda, potash and lime constituting substantially the balance, said glass absorbing substantially all radiations in the ultra-violet and infra-red regions of the spectrum and in the visible region having its maximum transmission on opposed sides of the sodium line, with substantially no transmission at said sodium line.

2. A protective glass of the character described consisting essentially of a silica-soda-potash-lime base containing from 1 to 10 per cent by weight of iron oxides and form approximately 2 to 5 per cent of neodymium oxide, the silica constituting from about 50% to about 72% by weight of the glass, and said glass for a two millimeter thickness transmitting less than ⅕ of 1 per cent of ultra-violet radiations shorter than 350 millimeters, having its maximum transmission in the visible region on opposed sides of the sodium line, with substantially no transmission at the sodium line, said glass having a total transmission in said visible region of less than 15% with efficiency for absorbing at the sodium line being greater than 75 per cent, and said glass having a total energy transmission of less than 4 per cent.

3. An ultra-violet and infra-red absorbing glass having its greatest amount of transmission in the visible region on opposed sides of the sodium line, with substantially no transmission at said line, said glass consisting of a soda-potash-lime-silica base containing iron oxides and a mixture of rare earth oxides including neodymium oxide in its composition, said iron oxides comprising from about 1 to 10% by weight of the glass, the silica comprising at least half by weight of the glass and the rare earth oxides together with the silica from about 60 to 85% of the glass and the soda, potash and lime constituting the balance, the proportion of neodymium oxide being sufficient to provide said glass with an efficiency for absorbing at the sodium line of in excess of 75%.

4. An infra-red and ultra-violet absorbing glass having its greatest transmission in the visible region and on opposed sides of the sodium line, with substantially complete absorption at said line, and consisting substantially of the following approximate parts by weight:

| | |
|---|---|
| Silica | 50 to 72 |
| Sodium oxide and potassium oxide | 10 to 18 |
| Calcium oxide | 1 to 10 |
| Iron oxides | 1 to 10 |
| and | |
| A mixture of rare earth oxides as derived from monoazite sand and containing approximately 17% by weight of neodymium oxide | 10 to 30 |

5. An infra-red and ultra-violet absorbing glass having its greatest transmission in the visible region and on opposed sides of the sodium line, with substantially complete absorption at said line, and consisting of the following approximate parts by weight:

| | |
|---|---|
| Silica | 54 |
| Sodium oxide | 10 |
| Potassium oxide | 5 |
| Calcium oxide | 2 |
| Iron oxides | 1 to 10 |
| and | |
| A mixture of rare earth oxides as derived from monazite sand and containing approximately 17% by weight of neodymium oxide | 24 |

6. An infra-red and ultra-violet absorbing glass having its greatest transmission in the visible region and on opposed sides of the sodium line, with substantially complete absorption at said line, and consisting of the following approximate parts by weight:

| | |
|---|---|
| Silica | 54 |
| Sodium oxide | 10 |
| Potassium oxide | 5 |
| Calcium oxide | 2 |
| Iron oxides | 1 to 10 |
| A mixture of rare earth oxides containing approximately 17% by weight of neodymium oxide | 24 |
| and | |
| A fining agent selected from the group consisting of sulfur trioxide, chlorine, sodium sulphate, sodium chloride, arsenic pentoxide, antimony pentoxide and mixtures thereof | Trace to 3 |

7. In the process of forming a colored infra-red and ultra-violet absorbing glass having a controlled efficiency for absorbing radiations at the sodium line, the steps of adding to a silica, soda, potash, lime base batch from 1 to 10 per cent by weight of iron oxides and a sufficient amount of a mixture of rare earth oxides containing neodymium oxide to introduce from approximately 2 to 5% by weight of said neodymium oxide to the glass, varying the proportions of the silica between about 50 and about 72%, the lime between about 1 and about 10%, and the potash and soda between about 10 and 18%, according to the proportions of the mixture of rare earth oxides added to the batch, said mixture having glass forming characteristics similar to said ingredients of the base batch, adding the iron oxides in proportion according to the amount of transmission in the visible region of the spectrum desired and the amount of neodymium oxides in proportion according to the desired efficiency for absorbing at the sodium line, and melting said batch while subjecting it to a reducing agent to cause the iron oxides to assume ferric and ferrous forms to provide infra-red and ultra-violet absorbing characteristics whereby the batch will be fused into a glass of the desired properties.

EDGAR D. TILLYER.

REFERENCES CITED

The following references are of record in the file of this patent:

UNITED STATES PATENTS

| Number | Name | Date |
|---|---|---|
| 1,726,635 | Taylor | Sept. 3, 1929 |
| 2,219,122 | Weidert et al. | Oct. 22, 1940 |

FOREIGN PATENTS

| Number | Country | Date |
|---|---|---|
| 571,017 | Germany | 1933 |